United States Patent
Vijayvargiya et al.

(10) Patent No.: US 10,372,607 B2
(45) Date of Patent: Aug. 6, 2019

(54) SYSTEMS AND METHODS FOR IMPROVING THE EFFICIENCY OF POINT-IN-TIME REPRESENTATIONS OF DATABASES

(71) Applicant: Veritas Technologies LLC, Mountain View, CA (US)

(72) Inventors: Shirish Vijayvargiya, Pune (IN); Sanjay Jain, Pune (IN)

(73) Assignee: Veritas Technologies LLC, Santa Clara, CA (US)

( * ) Notice: Subject to any disclaimer, the term of this patent is extended or adjusted under 35 U.S.C. 154(b) by 780 days.

(21) Appl. No.: 14/938,879

(22) Filed: Nov. 12, 2015

(65) Prior Publication Data

US 2017/0091257 A1    Mar. 30, 2017

(30) Foreign Application Priority Data

Sep. 29, 2015 (IN) .......................... 3106/DEL/2015

(51) Int. Cl.
*G06F 11/14* (2006.01)
*G06F 16/27* (2019.01)
*G06F 12/0802* (2016.01)

(52) U.S. Cl.
CPC .......... *G06F 12/0802* (2013.01); *G06F 11/14* (2013.01); *G06F 16/27* (2019.01)

(58) Field of Classification Search
CPC ........... G06F 12/0802; G06F 17/30575; G06F 11/14; G06F 2212/1032; G06F 16/27; H05K 999/99
See application file for complete search history.

(56) References Cited

U.S. PATENT DOCUMENTS 5,333,316 A    7/1994  Champagne et al.
5,719,983 A    2/1998  Henderson et al.
(Continued)

FOREIGN PATENT DOCUMENTS

EP    1837783 A1 *  9/2007  ....... G06F 17/30091

OTHER PUBLICATIONS

1 Introduction to the Oracle Database; Database Concepts; http://docs.oracle.com/cd/B19306_01/server.102/b14220/intro.htm, as accessed Sep. 1, 2015; (Nov. 20, 2011), 27 pages.
(Continued)

*Primary Examiner* — Albert M Phillips, III
(74) *Attorney, Agent, or Firm* — FisherBroyles, LLP

(57) ABSTRACT

The disclosed computer-implemented method for improving the efficiency of point-in-time representations of databases may include (1) identifying a database that includes (A) one or more utilized storage locations that store substantive data and (B) one or more empty storage locations that are not currently storing any substantive data, (2) creating a point-in-time representation of the database by (A) identifying the empty storage locations and (B) flagging the empty storage locations in connection with the point-in-time representation of the database, (3) detecting a request to write certain substantive data to at least one of the empty storage locations, and then in response to detecting the request, (4) satisfying the request while refraining from performing a copy-on-write operation on the empty storage location due at least in part to the empty storage location not currently storing any substantive data. Various other methods, systems, and computer-readable media are also disclosed.

20 Claims, 7 Drawing Sheets

(56) References Cited

U.S. PATENT DOCUMENTS

| | | | |
|---|---|---|---|
| 8,924,353 B1 | 12/2014 | Patwardhan et al. | |
| 2004/0006565 A1* | 1/2004 | Shmueli | G06F 17/30067 |
| 2004/0133602 A1* | 7/2004 | Kusters | G06F 3/061 |
| 2004/0221089 A1* | 11/2004 | Sato | G06F 12/0866 |
| | | | 711/100 |
| 2005/0033878 A1 | 2/2005 | Pangal et al. | |
| 2013/0159257 A1* | 6/2013 | Rao | G06F 11/1451 |
| | | | 707/649 |
| 2016/0098413 A1* | 4/2016 | Stephenson | G06F 17/30088 |
| | | | 707/639 |

OTHER PUBLICATIONS

Dell Equallogic; Microsoft SQL Server—Overview; http://www.equallogic.com/partnerships/default.aspx?id=6479, as accessed on Aug. 17, 2011; (Mar. 3, 2009), 2 pages.

Dell Equallogic; Technical Report—SQL Server Data Protection with Auto-Snapshot Manager; http://www.equallogic.com/uploadedFiles/Resources/Tech_Reports/TR1032_ASM_SQL.pdf; EqualLogic, Inc.; (Sep. 2001), 44 pages.

Equallogic; SQL Server Advanced Protection and Fast Recovery with Equallogic Auto-Snapshot Manager; http://www.cns-service.com/equallogic/pdfs/WP911_SQL-Server_Advanced-Protection.pdf, as accessed on Aug. 17, 2011; (on or before Aug. 17, 2011), 6 pages.

Kedar Patwardhan, et al; Systems and Methods for Copying Database Files; U.S. Appl. No. 13/291,753, filed Nov. 8, 2011.

\* cited by examiner

SYSTEMS AND METHODS FOR IMPROVING THE EFFICIENCY OF POINT-IN-TIME REPRESENTATIONS OF DATABASES

BACKGROUND

Point-in-time representations (such as snapshots and/or storage checkpoints) often reference and/or include copies of data extents stored in a primary database. For example, a primary database may be pre-allocated with various data extents, including used data extents that store substantive data, unused data extents that store a null value, and/or free data extents that store no data at all. In this example, a conventional snapshot technology may initiate a snapshot that represents the primary database at a specific point in time. This snapshot may facilitate backup copies of those data extents and/or restoration of the primary database in the event of data corruption or failure.

Continuing with the above example, the conventional snapshot technology may detect a write operation directed to an unused and/or free data extent. In this example, the snapshot and the primary database may share the used data extents, the unused data extents, and the free data extents. As a result, the conventional snapshot technology may modify the snapshot by reading the unused and/or free data extent implicated by the write operation, allocating a new data extent, copying the data from the implicated data extent to the new data extent, and then writing new data to the implicated data extent. Unfortunately, since the unused and/or free data extent is potentially unnecessary for the restoration of the primary database, this snapshot modification may provide little, if any, benefit to the snapshot. In fact, this snapshot modification may, in the application write context, impair the performance or speed of the snapshot technology, increase the amount of storage space consumed by the snapshot, and/or cause or lead to fragmentation.

The instant disclosure, therefore, identifies and addresses a need for additional and improved systems and methods for improving the efficiency of point-in-time representations of databases.

SUMMARY

As will be described in greater detail below, the instant disclosure describes various systems and methods for improving the efficiency of point-in-time representations of databases. In one example, a computer-implemented method for improving the efficiency of point-in-time representations of databases may include (1) identifying a database that includes (A) one or more utilized storage locations that store substantive data and (B) one or more empty storage locations that are not currently storing any substantive data, (2) creating a point-in-time representation of the database by (A) identifying the empty storage locations that are not currently storing any substantive data within the database and (B) flagging the empty storage locations in connection with the point-in-time representation of the database, (3) detecting a request to write certain substantive data to at least one of the empty storage locations flagged in connection with the point-in-time representation of the database, and then in response to detecting the request, (4) satisfying the request while refraining from performing a copy-on-write operation on the at least one of the empty storage locations due at least in part to the at least one of the empty storage locations not currently storing any substantive data.

In some examples, the point-in-time representation of the database may include a snapshot of the database and/or a storage checkpoint of the database. In one example, the method may include ensuring that the empty storage locations are not shared by the database and the snapshot. Additionally or alternatively, the method may include ensuring that the empty storage locations are not shared by the database and the storage checkpoint.

In some examples, the method may also include querying a database management application for metadata that identifies the utilized storage locations and the empty storage locations. In one example, the method may also include building a collection of references to the utilized storage locations and then adding, to the collection, references to the empty storage locations. In this example, the references to the empty storage locations may indicate that those storage locations are not currently storing any substantive data.

In some examples, the point-in-time representation may reference the utilized storage locations. In such examples, the method may also include detecting another request to write at least some substantive data to at least one of the utilized storage locations referenced by the point-in-time representation. Additionally or alternatively, the method may include performing a copy-on-write operation on the at least one of the utilized storage locations due at least in part to the at least one of the utilized storage locations storing substantive data.

In some examples, the method may also include creating metadata that identifies the empty storage locations by offset and offset length. In such examples, the method may further include maintaining the metadata in connection with the database to facilitate identifying the empty storage locations that are not currently storing any substantive data within the database. Additionally or alternatively, the method may include storing the metadata in the point-in-time representation of the database.

In some examples, the method may include loading at least a portion of the substantive data included in the database into a cache. In one example, the method may include loading at least a portion of the metadata into the cache. Additionally or alternatively, the method may include performing a restore operation that restores at least a portion of the substantive data to the database by reading the metadata.

In one embodiment, a system for implementing the above-described method may include (1) an identification module, stored in memory, that identifies a database that includes (A) one or more utilized storage locations that store substantive data and (B) one or more empty storage locations that are not currently storing any substantive data, (2) a creation module, stored in memory, that creates a point-in-time representation of the database by (A) identifying the empty storage locations that are not currently storing any substantive data within the database and (B) flagging the empty storage locations in connection with the point-in-time representation of the database, (3) a detection module, stored in memory, that detects a request to write certain substantive data to at least one of the empty storage locations flagged in connection with the point-in-time representation of the database, and (4) an input/output module, stored in memory, that satisfies the request while refraining from performing a copy-on-write operation on the at least one of the empty storage locations due at least in part to the at least one of the empty storage locations not currently storing any substantive data.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a database that includes (A) one or more utilized storage locations that store substantive data and (B) one or more empty storage locations that are not currently storing any substantive data, (2) create a point-in-time representation of the database by (A) identifying the empty storage locations that are not currently storing any substantive data within the database and (B) flagging the empty storage locations in connection with the point-in-time representation of the database, (3) detect a request to write certain substantive data to at least one of the empty storage locations flagged in connection with the point-in-time representation of the database, and then in response to detecting the request, (4) satisfy the request while refraining from performing a copy-on-write operation on the at least one of the empty storage locations due at least in part to the at least one of the empty storage locations not currently storing any substantive data.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
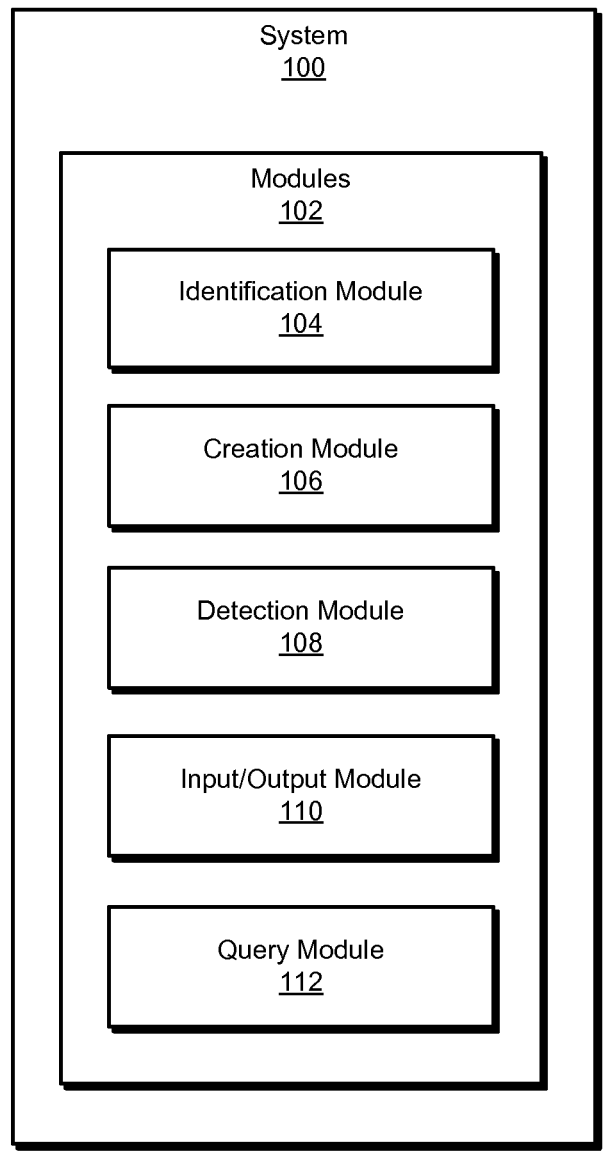
FIG. 1 is a block diagram of an exemplary system for improving the efficiency of point-in-time representations of databases.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for improving the efficiency of point-in-time representations of databases. As will be explained in greater detail below, by sharing only utilized storage locations between a primary database and point-in-time data representations, the various systems and methods described herein may avoid the unnecessary cost of performing un-sharing operations on empty storage locations. As a result, these various systems and methods may be able to improve the performance and/or efficiency of write operations and/or point-in-time representation technologies. Additionally or alternatively, these various systems and methods may be able to improve the storage space requirements for point-in-time representation technologies and/or the size of point-in-time representations.

As an example, a primary database and a conventional snapshot of the primary database may reference various utilized data extents that include substantive data, unutilized data extents that include non-substantive data (such as NULLs), and free data extents that include no data at all. In this example, the primary database may reference those current data extents, and the conventional snapshot may reference those data extents as represented at a previous point in time. In the event of a write operation directed to a utilized data extent referenced by both the primary database and the conventional snapshot, the file system may preserve the conventional snapshot even though the data stored in the utilized data extent will be overwritten by the write operation. For example, the file system may modify the conventional snapshot by reading the utilized data extent implicated by the write operation, allocating a new data extent, copying the data from the implicated data extent to the new data extent, and then writing new data to the implicated data extent. This process and/or procedure may be referred to herein as an "un-sharing" operation and/or a "copy-on-write" operation.

Similarly, in the event of a write operation directed to an unutilized or free data extent referenced by both the primary database and the conventional snapshot, the file system may perform an un-sharing operation on the unutilized or free data extent even though the data extent is not storing any substantive data. For example, the file system may modify the conventional snapshot by reading the unutilized or free data extent implicated by the write operation, allocating a new data extent, copying any existing data or nothing at all from the implicated data extent to the new data extent, and then writing new data to the implicated data extent.

To improve the performance and/or space costs associated with point-in-time representation technologies, the various systems and methods described herein may perform un-sharing operations only when write operations are directed to utilized data extents. In other words, these systems and methods may refrain from performing such un-sharing operations when write operations are directed to unutilized or free data extents. As a result, these systems and methods may enable the file system that manages snapshots of the primary database to achieve performance and/or efficiency gains. Moreover, a snapshot captured using these systems and methods may be smaller and/or require less storage space than the conventional snapshot described above.

The following will provide, with reference to FIGS. 1, 2, 4, and 5, detailed descriptions of exemplary systems for improving the efficiency of point-in-time representations of databases. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for improving the efficiency of point-in-time representations of databases. As illustrated in this figure, exemplary system 100 may include one or more modules 102 for performing one or more tasks. For example, and as will be explained in greater detail below, exemplary system 100 may include an identification module 104 that identifies a database that includes (1) one or more utilized storage locations that store substantive data and/or (2) one or more empty storage locations that are not currently storing any substantive data. Exemplary system 100 may also include creation module 106 that creates a point-in-time representation of the database by (1) identifying the empty storage locations that are not currently storing any substantive data within the database and (2) flagging the empty storage locations in connection with the point-in-time representation of the database.

In addition, and as will be described in greater detail below, exemplary system 100 may include a detection module 108 that detects a request to write certain substantive data to at least one of the empty storage locations flagged in connection with the point-in-time representation of the database. Exemplary system 100 may also include an input/output module 110 that satisfies the request while refraining from performing a copy-on-write operation on the at least one of the empty storage locations due at least in part to the at least one of the empty storage locations not currently storing any substantive data. Exemplary system 100 may further include a query module 112 that queries a database management application for metadata that identifies the utilized storage locations and the empty storage locations. Although illustrated as separate elements, one or more of modules 102 in FIG. 1 may represent portions of a single module or application, such as a file system (e.g., VERITAS FILE SYSTEM, VERITAS CLUSTER FILE SYSTEM, and/or VERITAS VOLUME MANAGER).

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or storage device 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Figure 2:
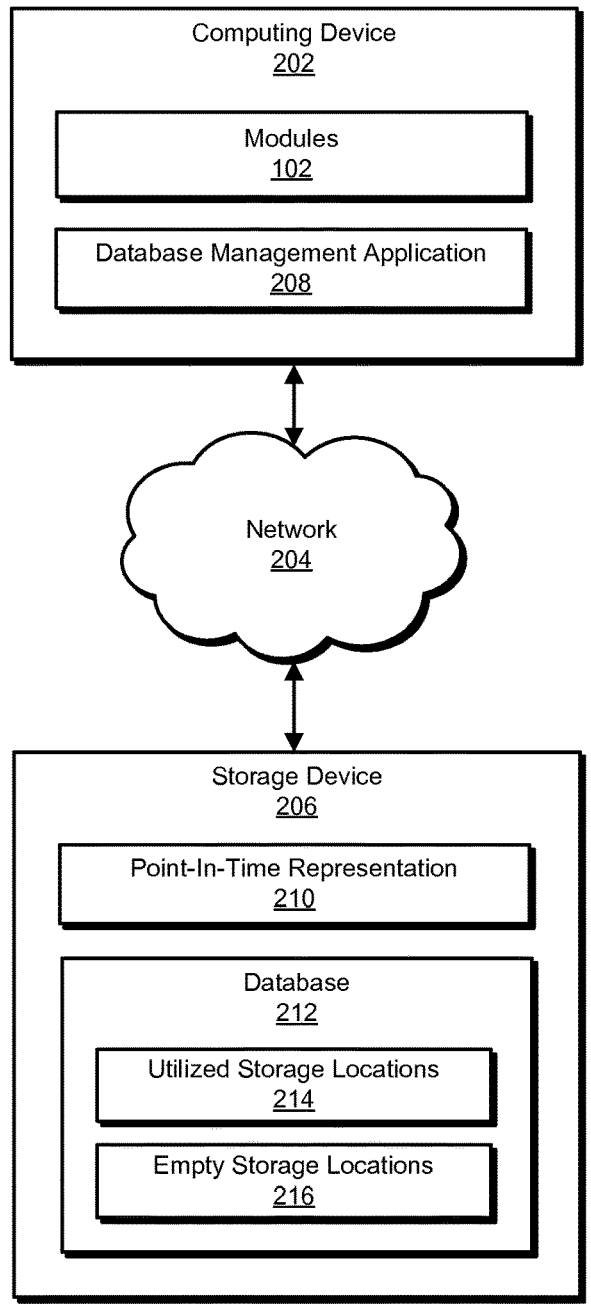
FIG. 2 is a block diagram of an additional exemplary system for improving the efficiency of point-in-time representations of databases.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a storage device 206 via a network 204. In one example, computing device 202 may be programmed with one or more of modules 102. In this example, computing device 202 may include a database management application 208 that manages, records, and/or provides information about a database (e.g., database 212 in FIG. 2). For example, database management application 208 may include and/or represent an ORACLE database or an ORACLE database server.

Additionally or alternatively, storage device 206 may be programmed with one or more of modules 102. In this example, storage device 206 may include a point-in-time representation 210 and/or a database 212. Moreover, database 212 may include and/or reference one or more of utilized storage locations 214 and/or empty storage locations 216.

In one embodiment, one or more of modules 102 from FIG. 1 may, when executed by at least one processor of computing device 202 and/or storage device 206, enable computing device 202 and/or storage device 206 to improve the efficiency of point-in-time representations. For example, and as will be described in greater detail below, one or more of modules 102 may cause computing device 202 and/or storage device 206 to (1) identify database 212 that includes and/or references (A) utilized storage locations 214 that store substantive data and (B) empty storage locations 216 that are not currently storing any substantive data, (2) create point-in-time representation 210 of database 212 by (A) identifying empty storage locations 216 that are not currently storing any substantive data within database 212 and (B) flag empty storage locations 216 in connection with point-in-time representation 210 of database 212, (3) detect a request to write certain substantive data to at least one of empty storage locations 216 flagged in connection with point-in-time representation 210 of database 212, and then in response to detecting the request, (4) satisfy the request while refraining from performing a copy-on-write operation on the at least one of empty storage locations 216 due at least in part to the at least one of empty storage locations 216 not currently storing any substantive data.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Storage device 206 generally represents any type or form of storage device capable of storing, maintaining, and/or providing data. Examples of storage device 206 include, without limitation, storage servers, Solid-State Drives (SSDs), disk drives, storage arrays or clusters, disk arrays, tape drives, deduplication storage devices, backup storage devices, flash drives, memory devices, portions of one or more of the same, combinations of one or more of the same, or any other suitable storage device. In one example, computing device 202 and storage device 206 may be separate and/or remote from one another. In another example, storage device 206 may alternatively represent a portion of computing device 202 (even though they are illustrated as separate and/or remote from one another in FIG. 2).

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and storage device 206.

Database management application 208 generally represents any type or form of application, software, interface, file system, and/or tool that enables computing devices and/or users to access data stored and/or referenced by a database. In one example, database management application 208 may include and/or represent a file system, a database server, and/or an object-relational database management system. For example, database management application 208 may include and/or represent an ORACLE database server. In this example, database management application 208 may manage large amounts of data stored in a multiuser environment. Additionally or alternatively, database management application 208 may enable multiple users to simultaneously access the same data. Although illustrated as residing on computing device 202 in FIG. 2, database management application may alternatively reside and/or run on storage device 206 and/or another computing device or server not illustrated in FIG. 2.

Database 212 generally represents any type or form of database and/or collection of data. In one example, database 212 may include and/or represent an ORACLE database. In this example, database 212 may include, identify, and/or reference various storage locations of storage device 206. For example, database 212 may include, identify, and/or reference utilized storage locations 214 and empty storage locations 216.

Utilized storage locations 214 each generally represent any type or form of storage area and/or memory location that stores substantive data within a storage device. In one example, utilized storage locations 214 may each include and/or represent a used pre-allocated data extent within storage device 206. In this example, utilized storage locations 214 may each include and/or store substantive data that represents at least a portion of a file. The term "substantive data," as used herein, generally refers to any type or form of data, metadata, and/or content of a file stored in a storage device.

Empty storage locations 216 each generally represent any type or form of storage area and/or memory location that stores either non-substantive data or no data at all within a storage device. In one example, some of empty storage locations 216 may include and/or represent an unutilized and/or unused pre-allocated data extent within storage device 206. In this example, such empty storage locations 216 may include and/or store non-substantive data (such as a NULL) that does not represent data, metadata, and/or content of a file. The term "non-substantive data," as used herein, generally refers to any type or form of value and/or character that does not represent data, metadata, and/or content of a file. Additionally or alternatively, such empty storage locations 216 may not be storing any data at all and may instead be completely vacant.

Point-in-time representation 210 generally refers to any type or form of representation, image, copy, and/or state of a database at a particular point in time. In one example, point-in-time representation 210 may include and/or represent a snapshot of database 212 at a particular point in time. Additionally or alternatively, point-in-time representation 210 may include and/or represent a storage checkpoint of database 212 at a particular point in time. Although illustrated as residing on storage device 206 in FIG. 2, point-in-time representation 210 may alternatively reside and/or be stored on computing device 202 and/or another computing or storage device not illustrated in FIG. 2.

Figure 3:
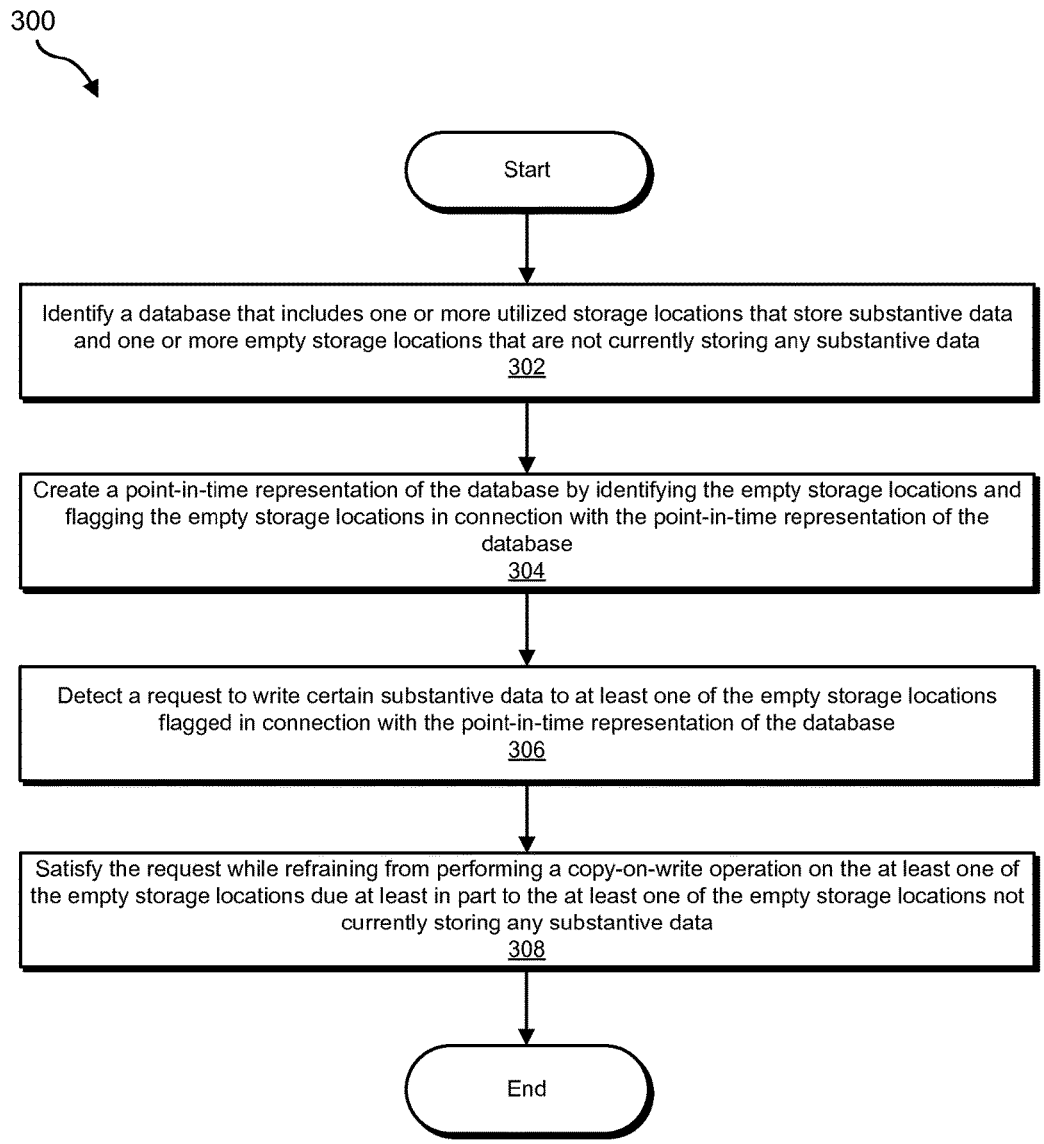
FIG. 3 is a flow diagram of an exemplary method for improving the efficiency of point-in-time representations of databases.

FIG. 3 is a flow diagram of an exemplary computer-implemented method 300 for improving the efficiency of point-in-time representations of databases. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify a database that includes one or more utilized storage locations that store substantive data and one or more empty storage locations that are not currently storing any substantive data. For example, identification module 104 may, as part of computing device 202 and/or storage device 206 in FIG. 2, identify database 212 located on storage device 206. In this example, database 212 may include and/or reference utilized storage locations 214 and empty storage locations 216.

The systems described herein may perform step 302 in a variety of ways. In some examples, identification module 104 may identify database 212 upon installation and/or mounting of database 212 to storage device 206. Additionally or alternatively, identification module 104 may identify database 212 as a user of computing device 202 attempts to access and/or join database 212. For example, identification module 104 may determine that a user of computing device 202 is logged into and/or using database management application 208 to access to database 212 via network 204. In this example, identification module 104 may identify database 212 as the user logs into and/or uses database management application 208 in an attempt to access database 212.

In some examples, identification module 104 may identify database 212 based at least in part on an input/output operation performed on database 212. For example, identification module 104 may detect a read or write request directed to database 212. In this example, identification module 104 may identify database 212 in response to and/or based at least in part on the read or write request directed to database 212.

As illustrated in FIG. 3, at step 304 one or more of the systems described herein may create a point-in-time representation of the database. For example, creation module 106 may, as part of computing device 202 and/or storage device 206 in FIG. 2, create point-in-time representation 210. In this example, point-in-time representation 210 may include and/or reference the substantive data stored in utilized storage locations 214. Additionally or alternatively, point-in-time representation 210 may exclude and/or fail to reference any data (or lack thereof) stored in empty storage locations 216. Accordingly, point-in-time representation 210 may include and/or reference only substantive data and exclude and/or avoid referencing any non-substantive data or empty storage locations 216.

The systems described herein may perform step 304 in a variety of ways. In some examples, creation module 106 may create point-in-time representation 210 by taking a snapshot of database 212 at a specific point in time. In other words, creation module 106 may freeze the file system that manages database 212 to prevent any modifications to the data stored in database 212. Additionally or alternatively, creation module 106 may produce a list of references to the substantive data stored in utilized storage locations 214. Creation module 106 may then store and/or maintain this list of references as a snapshot of database 212, which represents the state of the substantive data included in database 212 at a specific point in time.

In some examples, creation module 106 may create point-in-time representation 210 by making a storage checkpoint of database 212 at a specific point in time. In other words, creation module 106 may freeze the file system that manages database 212 to prevent any modifications to the data stored in database 212. Additionally or alternatively, creation module 106 may clone the substantive data stored in database 212 at a specific point in time and then store that substantive data as a storage checkpoint of database 212. Creation module 106 may also clone any metadata related to the substantive data at the specific point in time and then store that metadata as part of the storage checkpoint. Similarly, creation module 106 may create certain metadata that identifies, by offset and offset length, any storage locations that are storing non-substantive data and/or no data at all.

In one example, creation module 106 may create point-in-time representation 210 by invoking and/or using a FILE-SNAP feature of a VERITAS FILE SYSTEM that manages database 212. In another example, creation module 106 may create point-in-time representation 210 by invoking and/or using a storage checkpoint feature of a VERITAS FILE SYSTEM that manages database 212.

In some examples, creation module 106 may identify empty storage locations 216 that are not currently storing any substantive data within database 212. In one example, query module 112 may query database management application 208 for metadata that identifies utilized storage locations 214 and empty storage locations 216. For example, query module 112 may query, using a Structured Query Language (SQL), the ORACLE database server that manages the data included in database 212 for information that identifies empty storage locations 216 by offset and offset length. In this example, creation module 106 may then identify, flag, and/or mark empty storage locations 216 in connection with point-in-time representation 210 by analyzing the information obtained from the ORACLE database server. By identifying, flagging, and/or marking empty storage locations 216 in this way, creation module 106 may ensure that empty storage locations 216 are not shared by database 212 and point-in-time representation 210.

Additionally or alternatively, creation module 106 may create metadata that identifies the offset and offset length of empty storage locations 216 based at least in part on the information obtained from the ORACLE database server. Creation module 106 may also store and/or maintain this metadata in connection with database 212 to facilitate identifying empty storage locations 216 that are not currently storing any substantive data within database 212. In one example, creation module 106 may store and/or maintain the metadata in point-in-time representation 210 of database 212. For example, in the event that point-in-time representation 210 includes and/or represents a storage checkpoint, creation module 106 may store and/or maintain clones of the substantive data included in database 212 along with any metadata that is related to that substantive data and/or identifies empty storage locations 216. Additionally or alternatively, creation module 106 may load at least a portion of the substantive data included in database 212 into a cache (e.g., an SSD) and/or at least a portion of the metadata into the cache.

In one example, creation module 106 may create point-in-time representation 210 by building a collection of references to utilized storage locations 214. In this example, creation module 106 may exclude, from the collection, any references to empty storage locations 216. By excluding such references in this way, creation module 106 may be able to improve the storage space requirements for point-in-time representation 210 and/or the size of point-in-time representation 210.

Figure 4:
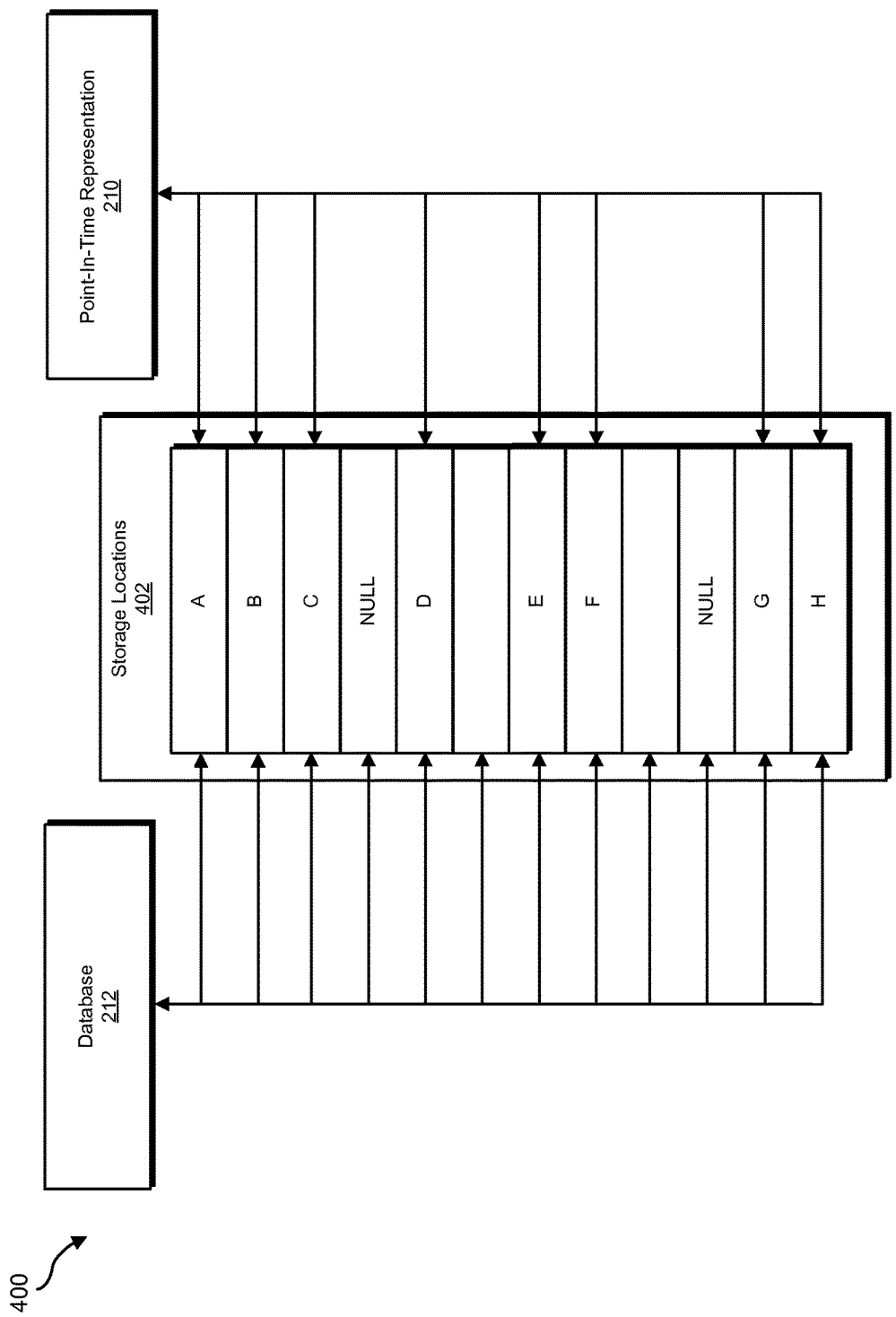
FIG. 4 is a block diagram of an additional exemplary system for improving the efficiency of point-in-time representations of databases.

As a specific example, FIG. 4 illustrates an implementation of an exemplary system 400 for improving the efficiency of point-in-time representations of databases. As illustrated in FIG. 4, system 400 may include storage locations 402 that collectively store various data (in this example, "A," "B," "C," "NULL," "D," "E," "F," "NULL," "G," and "H") and include a couple of free data extents that store no data at all. In this example, system 400 may also include database 212 that references each of storage locations 402 illustrated in FIG. 4.

In one example, creation module 106 may create point-in-time representation 210 in FIG. 4. In this example, point-in-time representation 210 may reference only those of storage locations 402 that include substantive data (such as "A," "B," "C," "D," "E," "F," "G," and "H"). Accordingly, point-in-time representation 210 may not reference any of storage locations 402 that include non-substantive data (such as NULLs) or no data at all.

As illustrated in FIG. 3, at step 306 one or more of the systems described herein may detect a request to write certain substantive data to at least one of the empty storage locations flagged in connection with the point-in-time representation of the database. For example, detection module 108 may, as part of computing device 202 and/or storage device 206 in FIG. 2, detect a request to write certain substantive data to at least one of empty storage locations 214 flagged in connection with point-in-time representation 210 of database 212. Accordingly, this write request may be directed to a data extent that is not currently storing any substantive data within storage device 206. In other words, this write request may be directed to an unused data extent that is storing a NULL or a free data extent that is not storing any data at all.

The systems described herein may perform step 306 in a variety of ways. In one example, detection module 108 may monitor computing device 202 and/or storage device 206 for input/output operations. While monitoring computing device 202 and/or storage device 206 in this way, detection module 108 may detect a write operation. In this example, detection module 108 may determine that the detected write operation is intended and/or configured to add substantive data to at least one of empty storage locations 216.

In one example, detection module 108 may detect the initiation of a write operation performed on database 212. In this example, detection module 108 may determine that the initiated write operation involves adding substantive data to at least one of empty storage locations 216.

As illustrated in FIG. 3, at step 308 one or more of the systems described herein may satisfy the request while refraining from performing a copy-on-write operation on the at least one of the empty storage locations due at least in part to the at least one of the empty storage locations not currently storing any substantive data. For example, input/output module 110 may, as part of computing device 202 and/or storage device 206 in FIG. 2, satisfy the write request while refraining from performing a copy-on-write operation on the empty storage location since that empty storage location is not currently storing any substantive data. By refraining from performing such a copy-on-write operation on the empty storage location in this way, input/output module 110 may enable the file system that creates and/or manages point-in-time representations of database 212 to achieve improved performance and/or efficiency.

The systems described herein may perform step 308 in a variety of ways. In one example, input/output module 110 may satisfy the write request by writing the substantive data identified by the write request. In this example, input/output module 110 may forgo copying the contents of the empty storage location to another storage location (within, e.g., storage device 206) prior to writing the substantive data identified by the write request to the empty storage location. In other words, input/output module 110 may allow the write request to be performed on the empty storage location without first copying a NULL or no data from the empty storage location to another storage location (within, e.g., storage device 206).

Figure 5:
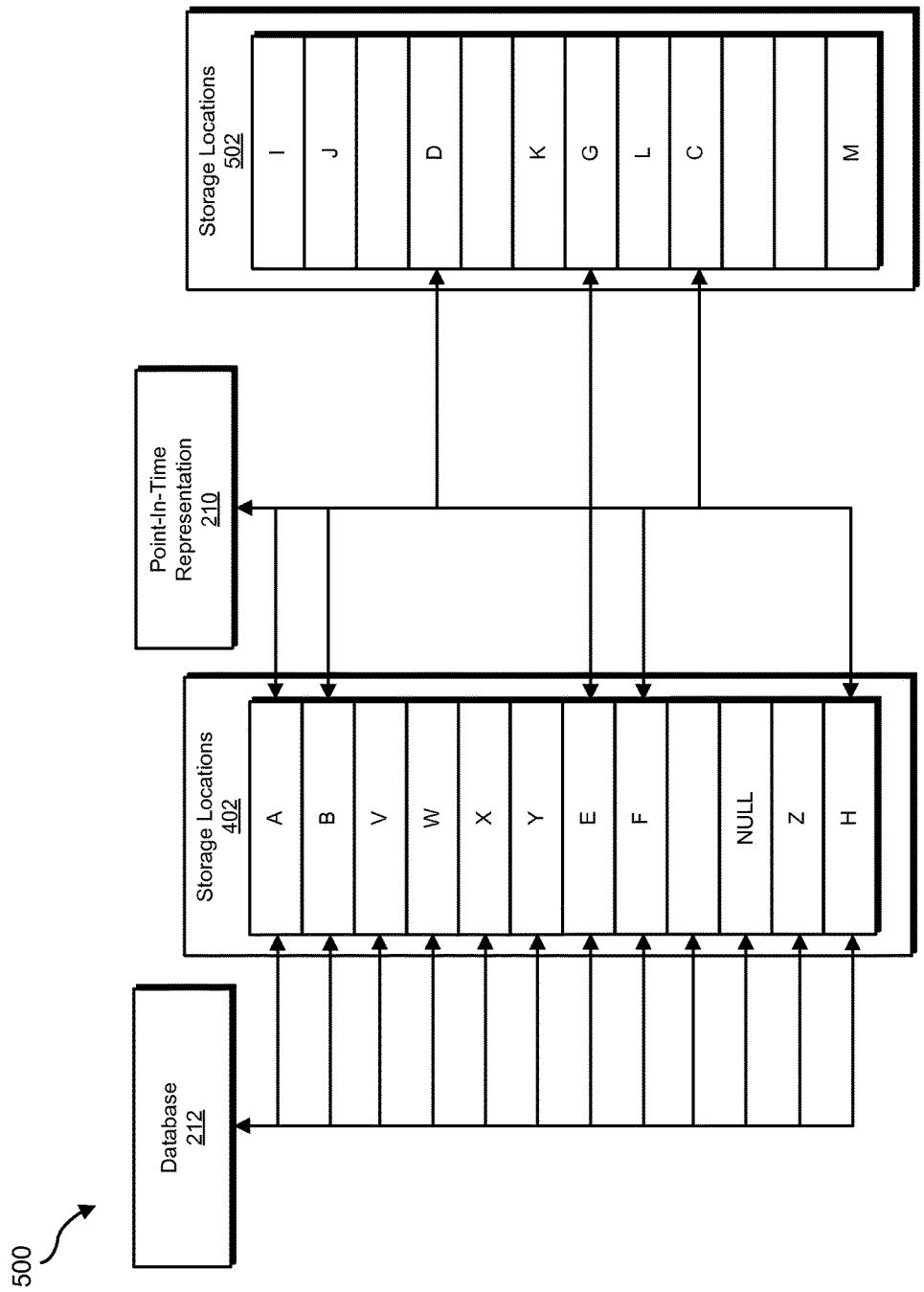
FIG. 5 is a block diagram of an additional exemplary system for improving the efficiency of point-in-time representations of databases.

As a specific example, FIG. 5 illustrates an implementation of an exemplary system 500 for improving the efficiency of point-in-time representations of databases. As illustrated in FIG. 5, system 500 may include storage locations 402 that previously stored certain data (in the example shown in FIG. 4, "A," "B," "C," "NULL," "D," "E," "F," "NULL," "G," and "H") and included a couple of free data extents at the point in time represented in FIG. 4. Since the point in time represented in FIG. 4, detection module 108 may have detected various write requests directed to storage locations 402. These write requests may have resulted in various modifications being made to storage locations 402 such that storage locations 402 store some different data (in this example, "A," "B," "V," "W," "X," "Y," "E," "F," "NULL," "Z," and "H") and include a free data extent at the point in time represented in FIG. 5.

For example, one write request may have caused input/output module 110 to overwrite the "C" data with "V" data. Because the "C" data constitutes and/or represents substantive data, input/output module 110 may have performed a copy-on-write operation on that storage location such that the "C" data is copied over to storage locations 502 in FIG. 5 prior to writing the "V" data to that storage location. In other words, input/output module 110 may read the "C" data from that storage location, allocate a new storage location, copy the "C" data to the new storage location, and then write the "V" data to the storage location that was previously storing the "C" data.

As another example, another write request may have caused input/output module 110 to overwrite a "NULL" with "W" data. Because the "NULL" constitutes and/or represents non-substantive data, input/output module 110 may have refrained from performing a copy-on-write operation on that storage location to improve the efficiency of point-in-time representation 210 and/or the corresponding file system technology.

As a further example, a further write request may have caused input/output module 110 to overwrite the "D" data with "X" data. Because the "D" data constitutes and/or represents substantive data, input/output module 110 may have performed a copy-on-write operation on that storage location such that the "D" data is copied over to storage locations 502 in FIG. 5 prior to writing the "X" data to that storage location. In other words, input/output module 110 may read the "D" data from that storage location, allocate a new storage location, copy the "D" data to the new storage location, and then write the "X" data to the storage location that was previously storing the "D" data.

As an additional example, an additional write request may have caused input/output module 110 to write "W" data to a free data extent that is storing no data at all within storage locations 402 in FIG. 5. Because that free data extent is storing no data, input/output module 110 may have refrained from performing a copy-on-write operation on that free data extent to improve the efficiency of point-in-time representation 210 and/or the corresponding file system technology.

As a supplementary example, a supplementary write request may have caused input/output module 110 to overwrite the "G" data with "Z" data. Because the "G" data constitutes and/or represents substantive data, input/output module 110 may have performed a copy-on-write operation on that storage location such that the "G" data is copied over to storage locations 502 in FIG. 5 prior to writing the "Z" data to that storage location. In other words, input/output module 110 may read the "G" data from that storage location, allocate a new storage location, copy the "G" data to the new storage location, and then write the "Z" data to the storage device that was previously storing the "G" data.

In one example, creation module 106 may update point-in-time representation 210 to account for the various modifications made to the data since the point in time at which point-in-time representation 210 in FIG. 4 was captured. For example, creation module 106 may update point-in-time representation 210 to reference those of storage locations 402 in FIG. 5 that include the corresponding substantive data (in this example, "A," "B," "E," "F," and "H") as well as those of storage locations 502 in FIG. 5 that include substantive data (in this example, "C," "D," and "G") copied from storage locations 402 as part of a copy-on-write operation.

In some examples, point-in-time representation 210 may facilitate backup copies of data extents included in database 212 and/or restoration of database 212 in the event of data corruption or failure. In one example, input/output module 110 may perform a restore operation that restores at least a portion of the substantive data to database 212 by reading metadata that identifies utilized storage locations 214 and/or empty storage locations 216 by offset and offset length.

As explained above in connection with FIGS. 1-5, a point-in-time representation technology may share only substantive data extents between a primary database and a point-in-time representation (such as a snapshot or storage checkpoint). For example, a VERITAS FILE SYSTEM may pre-allocate database files within an ORACLE database with used data extents, unused data extents (which include, e.g., NULLs), and/or free data extents. The VERITAS FILE SYSTEM may initiate SQL queries directed to an ORACLE database server that manages the ORACLE database. In response, the ORACLE database server may provide the VERITAS FILE SYSTEM with information that describes and/or identifies the layout of the ORACLE database.

Upon obtaining that information from the ORACLE database server via the SQL queries, the VERITAS FILE SYSTEM and/or a VERITAS VOLUME MANAGER may freeze the ORACLE database and/or use a VXSFADM command (or an equivalent command) to create a snapshot or storage checkpoint of the ORACLE database by invoking a FILESNAP or checkpoint feature. Such a snapshot may include and/or reference all of the data extents that store substantive data, as opposed to those data extents that include and/or reference non-substantive data or no data at all. In other words, the snapshot may exclude and/or fail to reference any data extents that store non-substantive data or no data at all. Similarly, such a storage checkpoint may include a cloned copy of all of the data extents that store substantive data as well as metadata about any unused and/or free data extents referenced by the snapshot.

In one example, the VERITAS FILE SYSTEM and/or the VERITAS VOLUME MANAGER may store certain unused and/or free data extents within the ORACLE database as a new metadata representation at the point in time that the snapshot is created. The VERITAS FILE SYSTEM may restore the unused and/or free data extents within the ORACLE database by reading and/or interpreting this new metadata representation. Additionally or alternatively, the VERITAS FILE SYSTEM and/or the VERITAS VOLUME MANAGER may pre-load ORACLE database files into cache (e.g., an SSD) by interpreting the layout of the ORACLE database files based at least in part on the information obtained via the SQL queries. The VERITAS FILE SYSTEM and/or the VERITAS VOLUME MANAGER may also cache the new metadata representation of the unused and/or free data extents.

Figure 6:
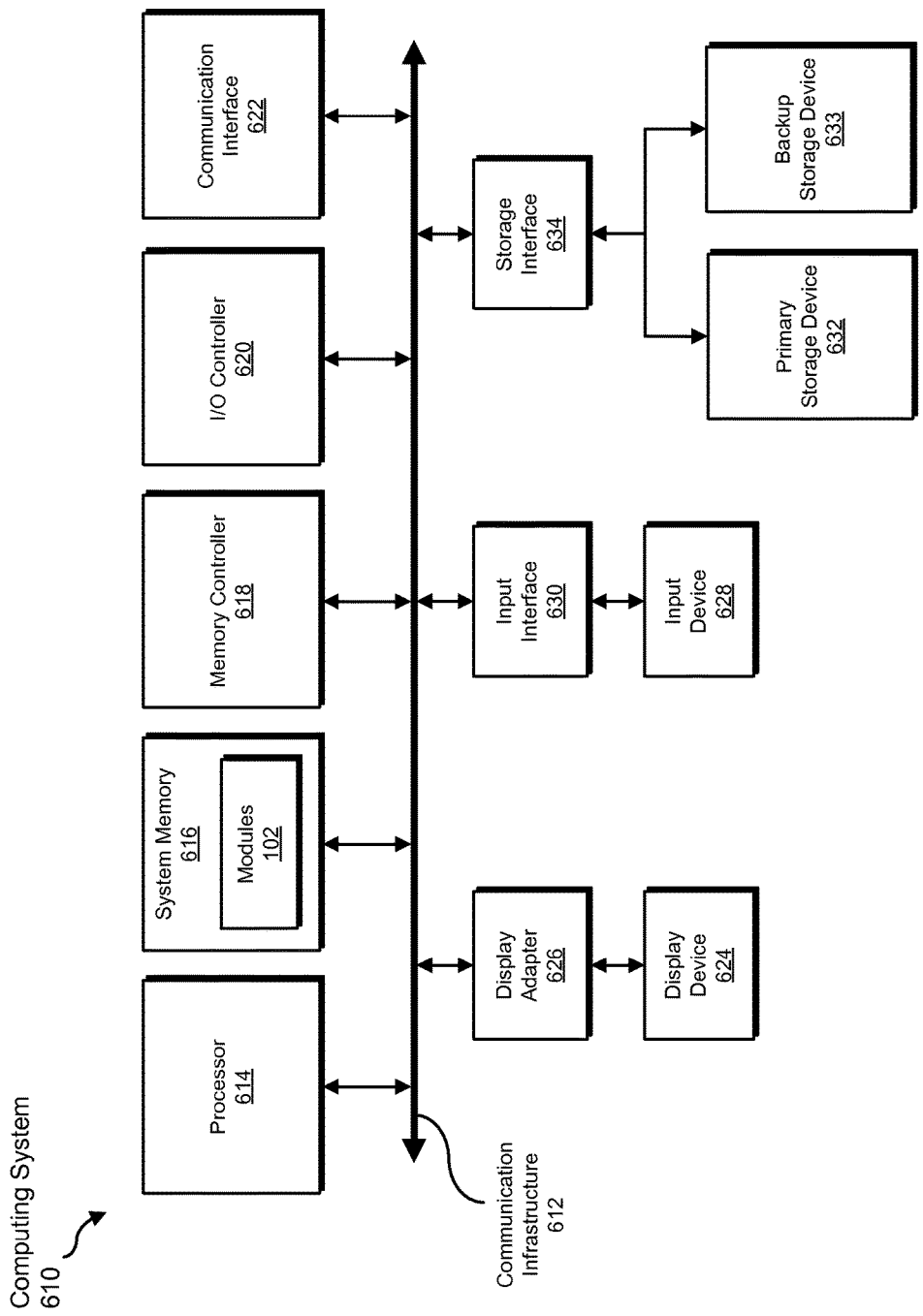
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an input/output controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
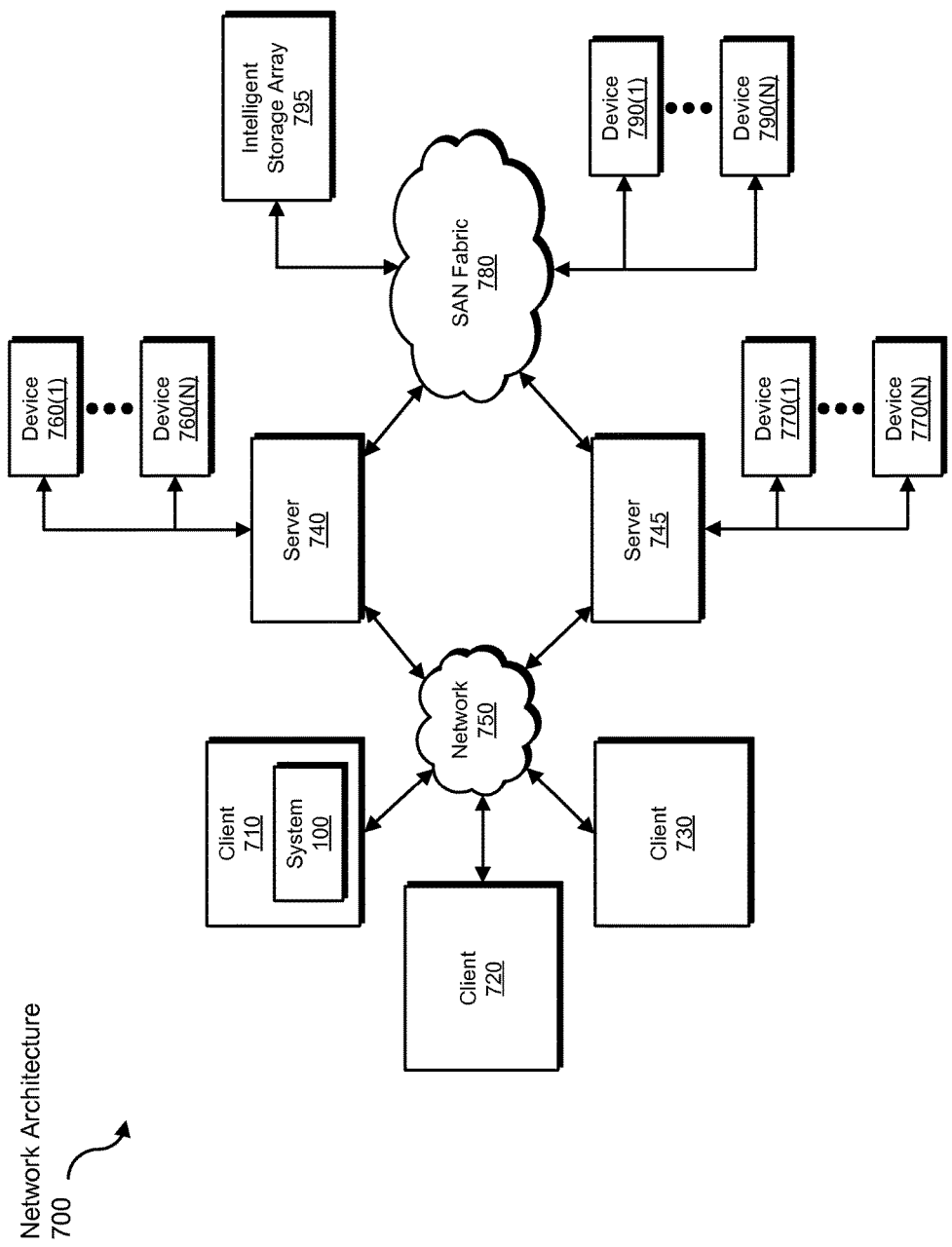
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for improving the efficiency of point-in-time representations of databases.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive data to be transformed, transform the data, output a result of the transformation to a snapshot, use the result of the transformation to facilitate restoration of a database, and store the result of the transformation for future use and/or reference. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for improving the efficiency of point-in-time representations of databases, at least a portion of the method being performed by a computing device comprising at least one processor, the method comprising:
    identifying a database that references:
        one or more utilized storage locations that store substantive data;
        one or more allocated unutilized storage locations that are currently storing non-substantive data comprising one or more characters that do not represent a portion of a file;
    creating a point-in-time representation of the database such that the database and the point-in-time representation of the database both reference the substantive data stored in the utilized storage locations but the point-in-time representation does not reference the allocated unutilized storage locations, wherein creating the point-in-time representative of the database comprises:
        identifying the allocated unutilized storage locations that are currently storing the non-substantive data by querying a database management application for metadata that identifies the allocated unutilized storage locations;
        flagging the allocated unutilized storage locations in connection with the point-in-time representation of the database;
    detecting a request to write certain substantive data to at least one of the allocated unutilized storage locations flagged in connection with the point-in-time representation of the database;
    in response to detecting the request, satisfying the request while refraining from performing a copy-on-write operation on the at least one of the allocated unutilized storage locations due at least in part to the at least one of the allocated unutilized storage locations currently storing the non-substantive data;
    detecting another request to write at least some substantive data to at least one of the utilized storage locations referenced by the point-in-time representation;
    in response to detecting the another request, performing a copy-on-write operation on the at least one of the utilized storage locations due at least in part to the at least one of the utilized storage locations storing substantive data.

2. The method of claim 1, wherein the point-in-time representation of the database comprises at least one of:
    a snapshot of the database;
    a storage checkpoint of the database.

3. The method of claim 2, wherein at least one of:
    flagging the allocated unutilized storage locations comprises ensuring that the allocated unutilized storage locations are not shared by the database and the snapshot;
    flagging the allocated unutilized storage locations comprises ensuring that the allocated unutilized storage locations are not shared by the database and the storage checkpoint.

4. The method of claim 1, wherein creating the point-in-time representation of the database comprises:
    building a collection of references to the utilized storage locations;
    excluding, from the collection, any references to the allocated unutilized storage locations.

5. The method of claim 1, wherein the point-in-time representation references the utilized storage locations;

further comprising:
 detecting another request to write at least some substantive data to at least one of the utilized storage locations referenced by the point-in-time representation;
 performing a copy-on-write operation on the at least one of the utilized storage locations due at least in part to the at least one of the utilized storage locations storing substantive data.

6. The method of claim 1, further comprising:
creating metadata that identifies the allocated unutilized storage locations by offset and offset length;
 maintaining the metadata in connection with the database to facilitate identifying the allocated unutilized storage locations that are not currently storing any substantive data within the database.

7. The method of claim 6, wherein maintaining the metadata comprises storing the metadata in the point-in-time representation of the database.

8. The method of claim 6, further comprising:
 loading at least a portion of the substantive data included in the database into a cache;
 loading at least a portion of the metadata into the cache.

9. The method of claim 6, further comprising performing a restore operation that restores at least a portion of the substantive data to the database by reading the metadata.

10. The method of claim 1, wherein the characters of the non-substantive data comprise a null.

11. A system for improving the efficiency of point-in-time representations of databases, the system comprising:
 an identification module, stored in memory, that identifies a database that references:
  one or more utilized storage locations that store substantive data;
  one or more allocated unutilized storage locations that are currently storing non-substantive data comprising one or more characters that do not represent a portion of a file;
 a query module, stored in memory, that queries a database management application for metadata that identifies the allocated unutilized storage locations;
 a creation module, stored in memory, that creates a point-in-time representation of the database such that the database and the point-in-time representation of the database both reference the substantive data stored in the utilized storage locations but the point-in-time representation does not reference the allocated unutilized storage locations, wherein creating the point-in-time representative of the database comprises:
  identifying, based at least in part on the metadata, the allocated unutilized storage locations that are currently storing the non-substantive data;
  flagging the allocated unutilized storage locations in connection with the point-in-time representation of the database;
 a detection module, stored in memory, that detects a request to write certain substantive data to at least one of the allocated unutilized storage locations flagged in connection with the point-in-time representation of the database;
 an Input/Output module, stored in memory, that satisfies the request while refraining from performing a copy-on-write operation on the at least one of the allocated unutilized storage locations due at least in part to the at least one of the allocated unutilized storage locations currently storing the non-substantive data;
 wherein the detection module further detects another request to write at least some substantive data to at least one of the utilized storage locations referenced by the point-in-time representation;
 wherein the Input/Output module further performs a copy-on-write operation on the at least one of the utilized storage locations due at least in part to the at least one of the utilized storage locations storing substantive data;
 at least one physical processor that executes the identification module, the query module, the creation module, the detection module, and the Input/Output module.

12. The system of claim 11, wherein the point-in-time representation of the database comprises at least one of:
 a snapshot of the database;
 a storage checkpoint of the database.

13. The system of claim 12, wherein the creation module at least one of:
 flags the allocated unutilized storage locations to ensure that the allocated unutilized storage locations are not shared by the database and the snapshot;
 flags the allocated unutilized storage locations comprises to ensure that the allocated unutilized storage locations are not shared by the database and the storage checkpoint.

14. The system of claim 11, wherein the creation module creates the point-in-time representation of the database by:
 building a collection of references to the utilized storage locations;
 excluding, from the collection, any references to the allocated unutilized storage locations.

15. The system of claim 11, wherein:
the point-in-time representation references the utilized storage locations;
the detection module detects another request to write at least some substantive data to at least one of the utilized storage locations referenced by the point-in-time representation;
the Input/Output module performs a copy-on-write operation on the at least one of the utilized storage locations due at least in part to the at least one of the utilized storage locations storing substantive data.

16. The system of claim 11, wherein:
the creation module creates metadata that identifies the allocated unutilized storage locations by offset and offset length;
the Input/Output module maintains the metadata in connection with the database to facilitate identifying the allocated unutilized storage locations that are not currently storing any substantive data within the database.

17. The system of claim 16, wherein the Input/Output module maintains the metadata by storing the metadata in the point-in-time representation of the database.

18. The system of claim 16, wherein the Input/Output module:
 loads at least a portion of the substantive data included in the database into a cache;
 loads at least a portion of the metadata into the cache.

19. The system of claim 11, wherein the characters of the non-substantive data comprise a null.

20. A non-transitory computer-readable medium comprising one or more computer-executable instructions that, when executed by at least one processor of a computing device, cause the computing device to:
 identify a database that references:
  one or more utilized storage locations that store substantive data;

one or more allocated unutilized storage locations that are currently storing non-substantive data comprising one or more characters that do not represent a portion of a file;

create a point-in-time representation of the database such that the database and the point-in-time representation of the database both reference the substantive data stored in the utilized storage locations but the point-in-time representation does not reference the allocated unutilized storage locations, wherein creating the point-in-time representative of the database comprises:

identifying the allocated unutilized storage locations that are currently storing the non-substantive data by querying a database management application for metadata that identifies the allocated unutilized storage locations;

flagging the allocated unutilized storage locations in connection with the point-in-time representation of the database;

detect a request to write certain substantive data to at least one of the allocated unutilized storage locations flagged in connection with the point-in-time representation of the database;

satisfy the request while refraining from performing a copy-on-write operation on the at least one of the allocated unutilized storage locations due at least in part to the at least one of the allocated unutilized storage locations currently storing the non-substantive data;

detect another request to write at least some substantive data to at least one of the utilized storage locations referenced by the point-in-time representation;

perform, in response to detecting the another request, a copy-on-write operation on the at least one of the utilized storage locations due at least in part to the at least one of the utilized storage locations storing substantive data.

* * * * *